H. H. WELCH.
ALARM DEVICE.
APPLICATION FILED JAN. 31, 1913.
1,232,444.
Patented July 3, 1917.
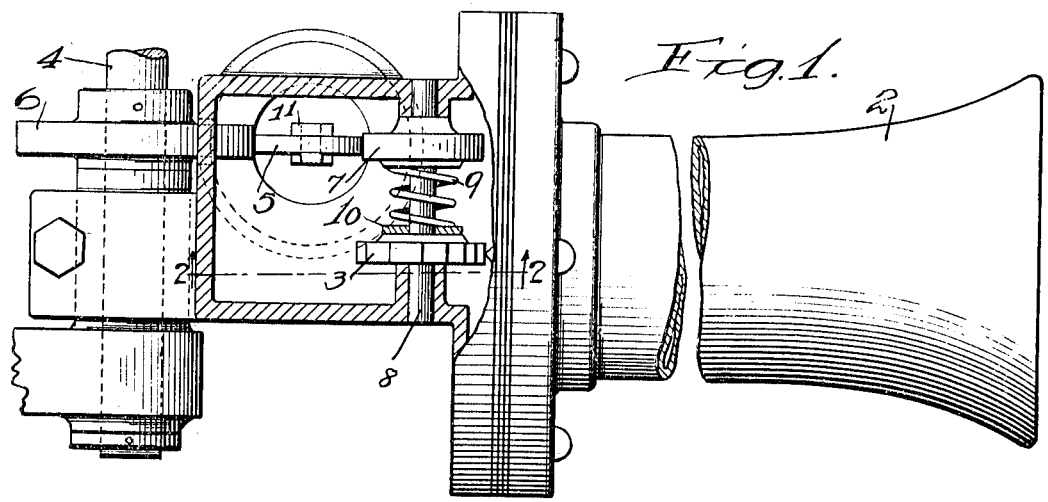
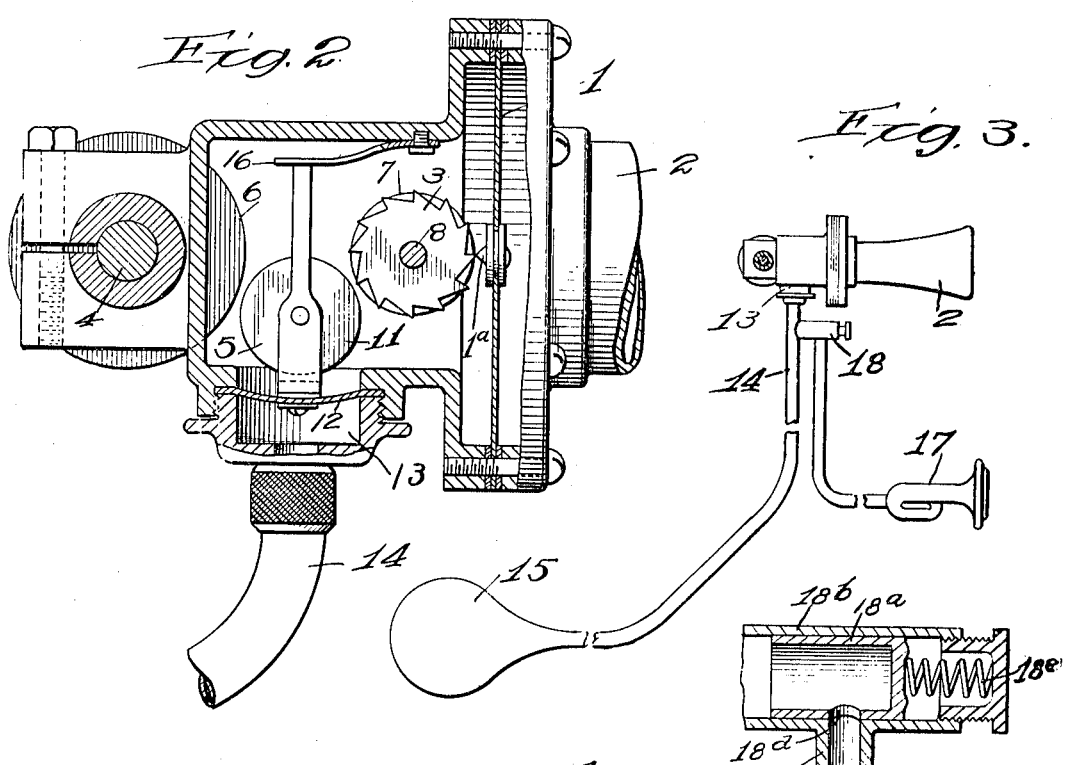
Inventor
Horace H. Welch.

UNITED STATES PATENT OFFICE.

HORACE H. WELCH, OF CHICAGO, ILLINOIS.

ALARM DEVICE.

1,232,444.     Specification of Letters Patent.     Patented July 3, 1917.

Application filed January 31, 1913. Serial No. 745,355.

*To all whom it may concern:*

Be it known that I, HORACE H. WELCH, a citizen of the United States, residing at Chicago, in the county of Cook and State of Illinois, have invented new and useful Improvements in Alarm Devices, of which the following is a specification, reference being had to the accompanying drawings, forming a part thereof.

The purpose of this invention is to provide an improved form of alarm device particularly adapted for use on motor vehicles and having special advantages when employed in combination with the common bulb-operated reed horn. It consists of the various features and elements and their combinations described and shown in the drawings as indicated by the claims.

In the drawings:—

Figure 1 is a top plan view partly in section showing an alarm device embodying this invention.

Fig. 2 is a sectional view taken as indicated at line 2—2 on Fig. 1.

Fig. 3 is a somewhat diagrammatic view indicating the mode of combining the alarm device shown in Figs. 1 and 2 with the common type of reed horn.

And Fig. 4 is a sectional detail showing the means for controlling the passage of air to the reed horn.

As shown in the drawings, the alarm device which is the subject of this invention comprises a diaphragm, 1, properly mounted with relation to a resonator, 2, and arranged to be forcibly vibrated by means of a rotary toothed wheel, 3, driven through disengageable operating connections from a continuously rotating shaft, 4, which may be connected in any convenient manner with the engine or motor of the vehicle upon which the alarm device is carried. The shaft, 4, will then be continuously rotated at least whenever the vehicle is in motion, and will ordinarily supply more than an abundance of power for operating the alarm device.

The disengageable connections above referred to comprise in the present instance a movably mounted transmitting wheel, 5, dimensioned when properly positioned to engage the peripheral surfaces of the wheel, 6, which is fast upon the shaft, 4, and a friction wheel, 7, rotatably mounted upon the shaft, 8, which carries the aforementioned toothed wheel, 3. Connection between the friction wheel, 7, and the toothed wheel, 3, is supplied in the form of a compression spring, 9, and a friction disk, 10, whose surface engages the flat surface of the wheel, 3, at one side, the opposite ends of the spring, 9, being fixed to the wheel, 7, and the disk, 10, respectively, so that the said disk is positively driven by the wheel, 7, and frictionally drives the toothed wheel, 3. The diaphragm, 1, has secured to it a wearing point, 1ª, through which it engages the teeth of the rotary wheel, 3.

The transmitting idler wheel, 5, is shown mounted in a carrier, 11, which is itself attached to a diaphragm, 12, forming one wall of an air chamber, 13, said air chamber communicating through a pipe or tube, 14, with the usual form of collapsible bulb, 15, as indicated in Fig. 3. To avoid dependence on gravity for holding the idler, 5, out of contact with the wheels, 6 and 7, a spring, 16, may be supplied, as shown in Fig. 2; then it will be understood that the alarm may be operated by quickly and strongly collapsing the bulb, 15, in the hand so as to increase the air pressure in the chamber, 13, forcing the diaphragm, 12, outward and moving the friction idler, 5, into contact with both the driving wheel, 6, and the wheel, 7, which is to be driven for rotating the toothed wheel, 3, and vibrating the diaphragm, 1, to produce an audible tone.

As is well understood, any given diaphragm mounted as shown will tend to vibrate at a definite rate, and this tendency will have a certain governing effect upon the possible speed of rotation of the toothed actuating wheel, 3, such, that if an attempt is made to rotate the wheel too rapidly the torque required for its rotation will increase suddenly as the impulses delivered by the toothed wheel begin to get out of harmony with the natural rate of vibration of the diaphragm; furthermore, if the power supplied to the rotary toothed wheel is sufficient to overcome this torque, and an excessive speed is attained by this wheel the diaphragm will cease vibrating sufficiently to deliver an audible note, and the entire device will become inoperative. Where the driving power is supplied to the toothed wheel through a separate electric motor, the capacity of such motor can be properly proportioned to the desired speed of the wheel, so that there will not be a sufficient excess of power to overcome the governing effect of the diaphragm, 1, which will then operate to keep the speed of the motor choked down to the proper point. But, since the present device is operated by a comparatively unlimited source of power, viz., the vehicle motor, it becomes necessary in some way to limit the portion of this power which is actually supplied for rotating the toothed wheel, 3; this is the function of the friction drive provided in the disk, 10. By properly proportioning the strength of the spring, 9, with respect to the diaphragm, 1, and its natural period of vibration, only a limited amount of the power delivered at the wheel may be transferred to the toothed wheel, 3, and the speed of the latter will then be properly governed as above explained by the vibration of the diaphragm itself.

Experience shows that for proper operation of the ordinary reed horn indicated at, 17, in Fig. 3, the air must be discharged into it from the bulb, 15, rather slowly and at comparatively low pressure, particularly if the reed is tuned for a low note as is usually the case, and that if the bulb, 15, is suddenly compressed so as to deliver air at high pressure to the horn, 17, the latter will not be sounded. This becomes a disadvantage in emergency situations where the excitement of the driver is likely to cause him to compress the bulb, 15, suddenly rather than slowly, thus defeating his own purpose and failing to give an alarm where one is most needed. Since, however, a sudden increase of air pressure in the bulb, 15, and its connected tubes will serve to distend the diaphragm, 12, and move the friction idler, 5, into operative position, it will be seen that when the diaphragm horn shown in Figs. 1 and 2, is connected by a branch tube, 14, with the regular bulb, 15, which is used to operate the reed horn, 17, then for emergency use the diaphragm horn will automatically come into service by reason of the natural quick collapsing of the bulb, 15, and a loud warning note will be delivered in place of the usually less penetrating note of the reed horn, 17. It will be understood that the ordinary reed horn will operate to choke back the air when it is delivered at too high pressure and will thus permit the desired high pressure to accumulate in the chamber, 13; but, if by experiment this is found not to be the case in any particular instance or some other type of low-pressure alarm is used in place of the horn, 17, shown, a control valve, 18, may be connected in the pneumatic system as indicated in Fig. 3. This valve may comprise a hollow piston, 18ª, slidable in the tube, 18ᵇ, for controlling the branch, 18ᶜ, which leads to the horn, 17, through the agency of a port, 18ᵈ, in the hollow piston. An adjustable spring, 18ᵉ, may be provided to determine the pressure at which the port 18ᵈ, will begin to close.

I claim:—

1. An alarm device comprising, a diaphragm, an actuator arranged for vibrating said diaphragm, said actuator comprising a wheel adapted to be driven, a driving wheel, a transmitting wheel dimensioned for simultaneous peripheral contact with said driving and driven wheels, an air chamber, carrying means for said transmitting wheel extending normally into said air chamber and supporting said wheel out of contact with said driving wheel, and a collapsible bulb communicating with said air chamber and adapted to supply additional air thereto for displacing said carrying means and moving the said transmitting wheel into contact with the driving wheel.

2. An automobile horn, comprising a resonator, a diaphragm and a toothed wheel mounted for rotation of its teeth against such diaphragm for vibrating the latter, means for rotating said toothed wheel, comprising a shaft and a disk, both co-axially mounted with respect to the toothed wheel, a compression spring having its ends connected, respectively, to said shaft and disk and reacting to press the disk into frictional contact with the side of the toothed wheel, a continuously moving driving element, and means for disengageably connecting said driving element with the aforesaid shaft at will.

3. In combination, two alarm devices, one operable by air at low pressure and inoperable by air at high pressure, the other operable by air at high pressure and inoperable by air at low pressure, and means communicating with both said devices adapted for supplying air either at high pressure or low pressure at will.

4. In combination, two signal devices, one operable by air at low pressure only, the other operable by air at high pressure only and adapted to produce a louder note than the first, and a manually operable pumping device connected for simultaneous communication with both signal devices and adapted for supplying air either at high or low pressure according to the manner in which it is operated.

5. In combination with a reed horn operable by air supplied at low pressure, an alarm device comprising a diaphragm adapted to produce an audible note when vibrated and pneumatic means operable only by air supplied at high pressure adapted for causing such vibration of said diaphragm, and a manually operable pumping device connected for simultaneous communication with said reed horn and said alarm device and adapted for supplying air either at high or low pressure according to the manner in which it is operated.

6. An alarm device comprising a diaphragm, an actuator arranged for vibrating said diaphragm and including a wheel adapted to be driven, a driving wheel, a transmitting wheel positioned for simultaneous peripheral contact with said driving and driven wheels, an air chamber having a movable wall, means for supporting said transmitting wheel from said movable wall, and means for varying the volume of air in said chamber to effect the bodily movement of said transmitting wheel into and out of operative position.

7. An alarm device including a diaphragm, a diaphragm casing, a continuously rotating driving wheel projecting into said casing, a cam for vibrating said diaphragm, a driven wheel connected with said cam, a power transmitting member within said casing between said driving and said driven members, an air chamber having a movable wall operatively connected to said power transmitting member, and means for varying the volume of air within said chamber to move said member into and out of operative position.

8. An alarm device including in combination, a diaphragm, an actuator therefor, a driving member, a member connected to said actuator and adapted to be driven, a transmitting member adapted for mechanically connecting the driving and driven members and movable into and out of connecting position, an air chamber, supporting means for the transmitting member extending normally into said air chamber, and means for supplying additional air to said chamber for displacing such supporting means and moving the transmitting member.

9. An alarm device including in combination, a diaphragm, an actuator therefor, a driving member, a member connected to said actuator and adapted to be driven, a transmitting member adapted for mechanically connecting them and mounted for movement into and out of connecting position, an air chamber, carrying means for said transmitting member normally extending into said air chamber and holding the member out of connecting position, and means for supplying additional air to said chamber for displacing said carrying means and moving the transmitting member into connecting position.

10. An alarm device adapted for use on motor vehicles including a diaphragm, a cam for vibrating said diaphragm, a shaft adapted to be driven from the engine of the vehicle, a reed horn, and pneumatic means for controlling the transmission of power from said shaft to said cam and for operating said reed horn.

11. In a signaling device, the combination of an elastic diaphragm, a shaft substantially parallel thereto, a cam rotor concentric with said shaft and rotatable to vibrate said diaphragm, a driven member also concentric with said shaft, means for rotating said member at high speed, a friction disk in engagement with said cam rotor, and resilient means for pressing said friction disk axially against said cam rotor, said cam rotor and friction disk being relatively rotatable whereby the vibratory movements of the diaphragm may limit the speed of rotation of the cam rotor in case of excessive speed of said driving means.

In testimony whereof I have hereunto set my hand at Chicago, Illinois, this 25th day of January, 1913.

HORACE H. WELCH.

Witnesses:
ROBT. N. BURTON,
EDNA M. MACINTOSH.